Jan. 26, 1960 A. M. HENKE ET AL 2,922,828
PROCESS FOR SEPARATING A MIXTURE OF ETHYL BENZENE AND STYRENE
Filed Dec. 31, 1958
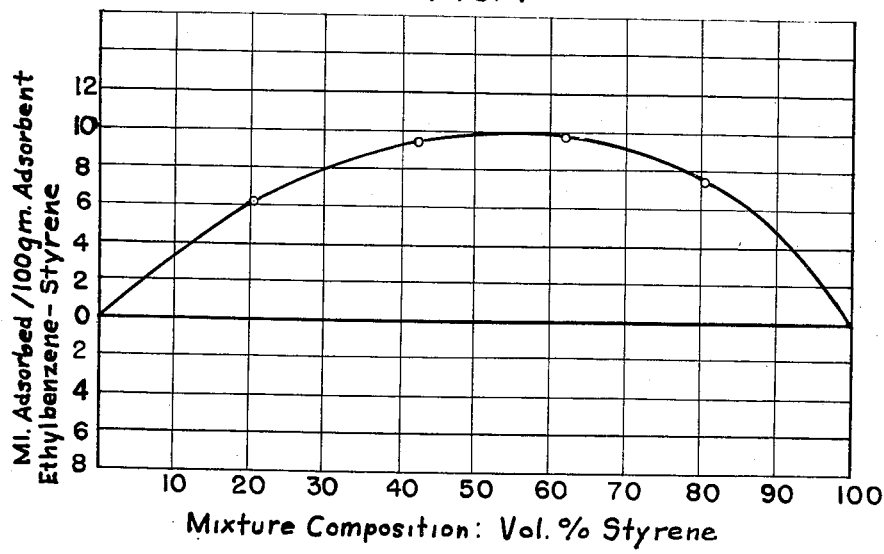
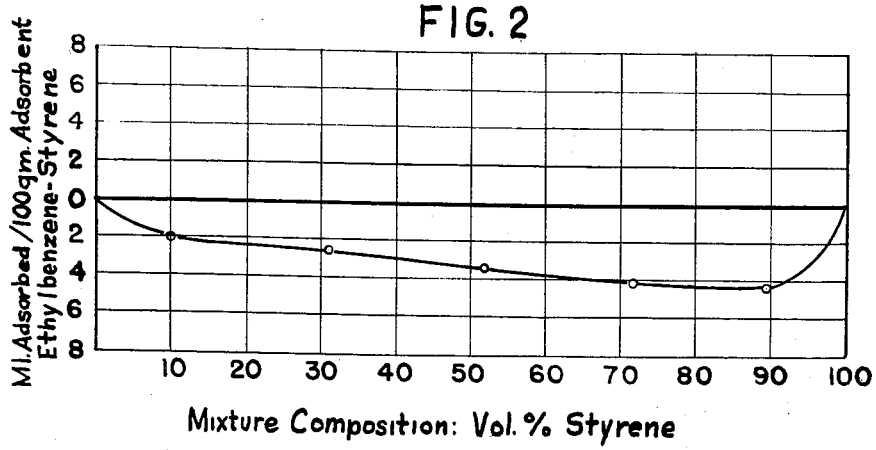
ALFRED M. HENKE
& ALLEN E. SOMERS
INVENTORS
BY
ATTORNEY United States Patent Office 2,922,828
Patented Jan. 26, 1960

2,922,828

PROCESS FOR SEPARATING A MIXTURE OF ETHYL BENZENE AND STYRENE

Alfred M. Henke, Springdale, and Allen E. Somers, O'Hara Township, Allegheny County, Pa., assignors to Gulf Research & Development Company, Pittsburgh, Pa., a corporation of Delaware Application December 31, 1958, Serial No. 784,110

5 Claims. (Cl. 260—674)

This invention relates to a separation process and more particularly to a process for separating mixtures of styrene and ethylbenzene into purified products by selective adsorption.

Styrene is usually manufactured by the dehydrogenation of ethylbenzene and in many of its uses must be had in a relatively pure state. The separation of ethylbenzene from styrene is difficult commercially because the difference in boiling points is not large and styrene has a tendency to polymerize when heated.

We have now developed a method for separating mixtures of ethylbenzene and styrene by selective adsorption, employing two adsorbents, one selective for ethylbenzene and the other selective for styrene. Our new method can produce both components in a purified form and can be carried out at normal temperatures and pressures without polymerizing the styrene and without requiring the use of a polymerization inhibitor, as is usually required when styrene is purified by distillation. The process has the further advantage of being capable of separating mixtures of any proportions of ethylbenzene and styrene and the capability of employing recycle of unseparated components. Our invention is based on the discovery of particular adsorbents that are unexpectedly adapted for producing high purity styrene and high purity ethylbenzene from a wide concentration range of mixtures of these compounds without causing polymerization of the styrene.

Our process in general comprises employing as adsorbents activated carbon and a porous solid consisting of at least 99 weight percent magnesium silicate on a water-free basis and having a surface area less than about 320 square meters per gram. A mixture of ethylbenzene and styrene is contacted with one of these adsorbents and an unadsorbed or weakly adsorbed liquid is recovered which is enriched in the component of the mixture that is not preferentially adsorbed by the adsorbent. The liquid more strongly adsorbed by the first adsorbent is enriched in the component that is preferentially adsorbed. This liquid is removed from the adsorbent and is contacted with the other of said adsorbents. Unadsorbed or weakly adsorbed liquid is then separated from the second adsorbent as a product enriched in the other component of the charge mixture. More strongly adsorbed liquid can then be removed from the second adsorbent and recycled to the first adsorbent with the fresh mixture.

Our invention will be described in more detail by reference to the drawings, Figures 1 and 2 of which are adsorption isotherms or graphs illustrating the adsorptive capacity for ethylbenzene and styrene of adsorbents used in our process as a function of concentration of the mixture of ethylbenzene and styrene at constant temperature. The isotherms shown in the drawing are so-called "U-type" isotherms. This type of isotherm is obtained when a component of a binary mixture is preferentially adsorbed by the adsorbent over the entire concentration range of the mixture. The other type of isotherm is the so-called "S-type" which is obtained when one component of a binary mixture is preferentially adsorbed by the adsorbent over only a portion of the concentration range, the other component being preferentially adsorbed over the rest of the range. An adsorbent exhibiting a U-type isotherm for a mixture to be separated is highly advantageous since it can be used for any concentration of the mixture.

The procedure used in determining each point on the adsorption isotherms of the drawings was to mix a known amount of granular adsorbent with a known amount of liquid mixture in a vessel at atmospheric pressure and at constant room temperature. The adsorbent and liquid were kept in contact in this manner long enough to achieve adsorption equilibrium. Then the composition of the supernatant or unadsorbed liquid was determined. This was done by first measuring the refractive index ($n_D^{20}$) of the unadsorbed liquid. Then, using data correlating refractive index with composition for mixtures of ethylbenzene and styrene, the concentration of components in the unadsorbed liquid was determined in the known manner.

The ethylbenzene used in all of our work was obtained by percolating high purity commercial ethylbenzene over active carbon. The purified ethylbenzene had a refractive index ($n_D^{20}$) of 1.4956 as compared with the literature value of 1.4959. Purified styrene was obtained by percolating a high purity commercial styrene having a boiling point at 8 mm. Hg. of 33°–35° C. over our magnesium silicate adsorbent to increase the purity and remove the stabilizer or polymerization inhibitor normally present in commercial styrene. The purified styrene had a refractive index ($n_D^{20}$) of 1.5470 as compared with the literature value of 1.5469.

In each test for determination of points on the isotherm curve the volume of the liquid mixture, the weight of the adsorbent and the volume fraction of the preferentially adsorbed component in the original mixture were known and the volume fraction of the preferentially adsorbed component in the unadsorbed liquid was measured. These values were used to calculate the specific adsorption capacity in milliliters adsorbed per 100 grams of adsorbent by the equation:

$$a = \frac{v}{m} \cdot \frac{X_0 - X}{1 - X}$$

where:

$a$=specific adsorption capacity (ml./100 gm.)
$v$=volume of binary mixture (ml.)
$m$=weight of adsorbent (gms./100)
$X_0$=volume fraction of the preferentially adsorbed component in the original binary mixture.
$X$=volume fraction of the preferentially adsorbed component in the equilibrium unadsorbed liquid.

We have determined adsorption isotherms in the manner described for adsorbents used in our process with mixtures of ethylbenzene and styrene. The results are shown in the drawings which plot specific adsorption capacity, as calculated by the above equation, against mixture concentration.

Figure 1 is an adsorption isotherm for an activated carbon adsorbent with different mixtures of the purified ethylbenzene and purified styrene. This adsorbent, which illustrates the type of activated carbon that is used in our process for selective adsorption of styrene, was a moderate activity carbon having a surface area of about 1100 square meters per gram. The particular material was a product of the Barnebey-Cheney Company of Columbus, Ohio, known as Adsorbite Type UT-2. This is a standard catalysis carbon which is prepared from nutshells. The carbon was dried at 800° F. before determining the adsorption isotherm. Conditions employed in determination of the isotherm included atmospheric pressure, temperature of 75° F. and a liquid to adsorbent weight ratio of about 1.8 to 1.

The isotherm of Figure 1 is a U-type isotherm. As the figure shows, the styrene is preferentially adsorbed by the carbon over the total concentration range of styrene-ethylbenzene mixtures. It should also be noted that the amount of styrene adsorbed per hundred grams of carbon was quite high, amounting to over 10 ml./100 gm. for the optimum mixture concentration. There was no evidence of polymerization of styrene on this adsorbent.

Figure 2 is an adsorption isotherm for ethylbenzene-styrene mixtures obtained with the magnesium silicate adsorbent known as Florisil, which we have discovered is selective for adsorption of ethylbenzene and does not cause polymerization of the styrene. Conditions employed in determination of the isotherm included atmospheric pressure, temperature of 78° F. and a liquid to adsorbent weight ratio of about 1.8 to 1. As Figure 2 shows, this adsorbent produced a U-type isotherm, indicating that ethylbenzene is preferentially adsorbed over the entire concentration range of ethylbenzene-styrene mixtures. There was no evidence of polymerization of styrene when contacted with this adsorbent under the conditions employed in determination of the isotherm.

The magnesium silicate adsorbent with which the isotherm of Figure 2 was obtained is uniquely adapted for our process for separating styrene from ethylbenzene. This material, instead of exhibiting an S-type isotherm at normal temperature and pressure which would be expected of an adsorbent possessing any selectivity at all for adsorption of ethylbenzene in preference to styrene, produces a U-type isotherm and is selective for adsorption of ethylbenzene from any mixture of ethylbenzene and styrene. Although it has an adsorptive capacity for ethylbenzene sufficiently high for practical separation of ethylbenzene and styrene, it does not cause substantial polymerization of the easily polymerizable styrene at normal temperature and pressure (i.e., 68° F. and atmospheric pressure) or even at substantially higher temperature. We do not wish to be bound by any theoretical explanations of this result, but it appears that the moderate surface area of the adsorbent makes it possible to contact it with a liquid mixture containing styrene without causing excessive temperature rise as a result of heat of adsorption or heat of wetting. Furthermore, the material is of very high purity. It is essentially free of impurities that may catalyze the polymerization of styrene as observed with less pure magnesium silicate adsorbents.

The magnesium silicate adsorbent that we have discovered has these unique qualities is the material known as Florisil which is a product of the Floridin Company of Warren, Pennsylvania. Its composition and method of manufacture are described in U.S. Patent 2,393,625 to Fitz Simons dated January 29, 1946. It is designated as a magnesium silicate or magnesia-silica gel adsorbent. It consists of hard, porous, white granules which are stable in either water or organic solvents and has the following average composition, on a water-free basis: MgO, 15.5∓0.5 weight percent and SiO$_2$, 84.0∓0.5 weight percent. The only significant impurity is sodium sulfate. The amount of Na$_2$SO$_4$ will be no more than 1.0 weight percent and normally will be about 0.5 weight percent. The surface area is below about 320 square meters per gram but will vary somewhat depending upon the activation temperature. Surface areas and pore volumes for typical samples of the adsorbent activated at different temperatures are given in the following table.

Table I

| Activation Temperature, ° F. | Surface Area, Sq. M./Gm. | Pore Volume, Ml. Liquid N$_2$/Gm.[1] |
| --- | --- | --- |
| 550 | 307 | 0.432 |
| 900 | 307 | 0.432 |
| 1,200 | 243 | 0.480 |
| 1,500 | 64 | 0.141 |
| 1,200[2] | 298 | 0.461 |

[1] Determined by the method of Brunauer et al., J. Am. Chem. Soc. 60 309 (1938).
[2] This test was made on a different batch of the adsorbent.

The particular Florisil adsorbent used by us in obtaining the isotherm of Figure 2 had a surface area of about 307 square meters per gram and a pore volume of 0.432 milliliter per gram. It was in granular form, 60 to 100 mesh particle size, and was heated at 650° F. for three hours before using.

We have contacted ethylbenzene-styrene mixtures with other adsorbents which proved to be unsatisfactory for various reasons. We have tried an adsorbent carbon of high activity having a surface area of about 1350 square meters per gram. This adsorbent preferentially adsorbed styrene from mixtures containing less than about 60 percent styrene. When contacted with mixtures containing more than 60 percent styrene, polymerization of the styrene occurred. Accordingly, this adsorbent is considered to be unsatisfactory for separating the full range of styrene-ethylbenzene mixtures. Presumably, the surface area of this material is so high that the heat of wetting is excessively high. Thus, when the styrene-ethylbenzene mixture is contacted with the dried adsorbent, the temperature rises so greatly as to polymerize the styrene if present in a high concentration. An adsorbent such as this which is selective for the adsorption of styrene could be used in our process by pre-wetting the adsorbent with ethylbenzene before contact with the styrene-ethylbenzene mixture. This will reduce somewhat the temperature rise caused by heat of wetting but there will still be some rise in temperature as the styrene is displaced by the ethylbenzene from the adsorbent by preferential adsorption. Therefore, we prefer to use a carbon adsorbent of moderate activity (i.e., surface area no greater than about 1100 sq. m./gm.) instead of using a more active adsorbent and pre-wetting the adsorbent with ethylbenzene to avoid excessive heat of wetting.

We have also tested adsorbent alumina for separation of ethylbenzene-styrene mixtures. Styrene is preferentially adsorbed over the entire concentration range by this adsorbent. However, this adsorbent is unsatisfactory because the magnitude of separation is too low to be practical. We obtained a U-type isotherm with the alumina adsorbent for ethylbenzene-styrene mixtures but the maximum selective adsorption capacity of the alumina for styrene was less than 2 milliliters of styrene per hundred grams of alumina. This is much less than the selective adsorption capacity of about 10 milliliters per hundred grams, obtained with activated carbon as shown in Figure 1.

We have found no adsorbents that exhibit the unique advantages for selective adsorption of ethylbenzene from mixtures of styrene and ethylbenzene which are exhibited by the Florisil adsorbent. Thus, silica gel exhibits an S-type isotherm with this mixture and can be used for only a limited range of concentration of ethylbenzene and styrene. We have also tried magnesium silicate adsorbents other than Florisil but they are unsatisfactory because they cause polymerization of the styrene. The following table provides a comparison of the characteristics of Florisil and two unsatisfactory magnesium silicate adsorbents, "A" and "B."

Table II

|  | Florisil | Adsorbent "A" | Adsorbent "B" |
| --- | --- | --- | --- |
| Surface Area, Sq. M./Gm. | 307 | 400 | 500 |
| Composition, Wt. Percent on Water-Free Basis: |  |  |  |
| Silica-Magnesia | 99.5 | 97.0 | 98.0 |
| $Na_2SO_4$ | .05 |  |  |
| CaO |  | 3.0 |  |
| $Al_2O_3$ |  |  | 0.8 |
| S |  |  | 0.2 |
| Na |  |  | 0.1 |
| Fe |  |  | 0.07 |
| F |  |  | 0.03 |
| Cl |  |  | 0.01 |
| Ratio of $SiO_2$ to MgO | 5.42 | 2.29 | 2.60 |

A comparison of adsorbents A and B with the Florisil adsorbent was made by contacting each of the adsorbents with mixtures of ethylbenzene and styrene according to the procedure used in determining isotherms. Five different mixtures of styrene and ethylbenzene were contacted with the adsorbents in the tests. The compositions of the mixtures, in terms of styrene content, were 10, 30, 50, 70 and 90 volume percent styrene. The tests were carried out at atmospheric pressure and at temperatures of 78° F. for the Florisil, 72° F. for adsorbent A and 72° F. and 32° F. for adsorbent B. In each instance the weight ratio of charge mixture to adsorbent was about 1.8 to 1. The results obtained with the Florisil were as indicated in the isotherm of Figure 2. With the other two adsorbents, refractive index measurements of the unadsorbed liquid indicated extensive polymerization of styrene in the mixtures of higher styrene content. After encountering polymerization in the test of adsorbent B at 72° F. the adsorbent was tested at 32° F. with the 50 percent and 90 percent styrene mixtures. The refractive index of the unadsorbed liquid from the 50 percent styrene mixture was slightly below that of styrene but indicated that substantial polymerization of styrene must have occurred. The refractive index of the unadsorbed liquid from the 90 percent styrene mixture was well above that of pure styrene, thus indicating very extensive polymerization.

The comparative tests of adsorbents A and B and Florisil demonstrate the unique suitability of Florisil for our process. Adsorbents A and B which are unsatisfactory because they cause rapid polymerization of the styrene are similar to Florisil in consisting predominantly of magnesia and silica or magnesium silicate, but they differ from Florisil in having a higher surface area, more impurities and a lower ratio of silica to magnesia (see Table II). Specifically, the Florisil is distinguished by having a composition of at least 99 weight percent magnesium silicate, a surface area less than 320 sq. m./gm. and a ratio of silica to magnesia greater than 5.

In contrast to the high surface area carbon that caused polymerization of the styrene, adsorbents A and B could not satisfactorily be used in our process by pre-wetting them with ethylbenzene to reduce the heat of wetting. Wetting the adsorbents with ethylbenzene would make them unsuitable for selective adsorption of ethylbenzene when contacted with the ethylbenzene-styrene mixture. Pre-wetting them with pure styrene would be unsatisfactory because styrene would be polymerized. Prewetting with any other type of liquid would complicate the process by requiring the separation of the prewetting liquid from the products of the process, especially from the styrene-enriched liquid which is first recovered from the silica-magnesia adsorbent.

The separation of liquid mixtures by selective adsorption can be carried out by different techniques and our process can employ any of such procedures. For instance, our process can employ the procedure known as frontal analysis or percolation. In this technique the mixture to be separated is introduced to the top of a column filled with the granular adsorbent and the introduction of the charge mixture is continued while percolate or filtrate liquid emerges from the bottom of the column. The first liquid to emerge will be enriched in the component of the charge mixture that is not preferentially adsorbed by the adsorbent. Continued charging of the liquid mixture to the column will cause the appearance in the percolate of an increasing concentration of the component that is preferentially adsorbed. Therefore, in order to obtain high purity products only a small amount of percolate should be collected, the exact amount to be collected depending upon the purity desired for the percolate product. After collecting this amount of liquid, which will be enriched in the component that is not preferentially adsorbed, the liquid remaining in the column will be removed and collected separately. This liquid can be removed by heating the column and/or drawing a vacuum on the outlet end of the column, or by washing the column with a suitable eluant or displacer liquid or gas.

In applying the percolation technique to our process, after the relatively strongly held material is removed from the first adsorbent column, it is then introduced to a second column containing the other granular adsorbent used in our process. The first liquid to emerge from the second column will be highly enriched in the component that is not preferentially adsorbed by the second adsorbent.

The percolation technique has the advantage of simplicity but an improvement in purity of the products is obtained by using the techniques of elution chromatography. This procedure has been described in connection with the fractionation of crude petroleum oil and of shale oil in the patents to Capell et al., U.S. 2,776,250 and U.S. 2,779,718. In elution chromatography a limited amount of the mixture to be separated is charged to the adsorbent bed. The amount of liquid, for example, will penetrate no more than about 90 percent of the adsorbent bed. All of the liquid is retained in the column, none of it emerging from the column before charging is discontinued. Then the column is eluted with one or more eluant liquids or gases, preferably with a series of eluants with excessively increasing eluting powers. Thus, the bed can be eluted first with a liquid such as a light paraffin, e.g., n-pentane, which is only weakly adsorbed by the adsorbent. This eluant will remove unadsorbed liquid from the adsorbent bed and the liquid removed will be enriched in the component of the mixture that is not preferentially adsorbed by the adsorbent. Thereafter, the bed can be eluted with a stronger eluant or with a displacer liquid which pushes the adsorbed material from the adsorbent bed. In this technique the differences in composition between the unadsorbed liquid removed with a weak eluant and the adsorbed material removed with a stronger eluant or displacer liquid will be greater than the differences in composition of fractions obtained by collecting portions of the percolate separately in the frontal analysis technique.

As we have indicated, our procedure of employing two adsorbents which are uniquely adapted for the ethylbenzene-styrene system can employ any of the known chromatographic or adsorption separation techniques. We have subjected mixtures of ethylbenzene and styrene to separation according to the percolation technique. This demonstrates results obtainable with our new process. A 500 milliliter liquid mixture comprising 68.5 percent ethylbenzene and the rest styrene was poured into the top of a cylindrical column one inch in diameter and four feet in length containing granular activated carbon Type UT–2 as previously described. The adsorbent weighed 222.3 grams and had a volume of 455 milliliters. It was heated for three hours at 800° F. before use. The first percolate emerging from the adsorption column, amounting to 5 volume percent of the charge contained 92.9 weight percent ethylbenzene in comparison to 68.5 weight percent ethylbenzene in the charge. Remaining portions of the percolate contained more styrene but portions up to 30 percent of the charge were considerably richer in ethylbenzene than the charge.

Subsequently, a styrene-ethylbenzene mixture containing 83.0 weight percent styrene was charged to a cylindrical column one inch in diameter and four feet in length containing 470 milliliters of granular Florisil adsorbent. The adsorbent had been dried at 650° F. before use. The amount of liquid mixture charged to the column was 500 milliliters. The first percolate recovered from the column, amounting to 10 weight percent of the charge mixture, contained 91.8 weight percent styrene. The styrene content decreased somewhat as percolation continued but the fraction corresponding to the range of 10 to 20 percent of the charge contained 91.7 weight percent styrene and the fraction corresponding to the range of 20 to 30 percent of the charge contained 91.0 percent styrene. The results of these two operations demonstrate that an ethylbenzene-styrene fraction can be separated with a carbon adsorbent to obtain a high purity ethylbenzene fraction and that a mixture similar to the more strongly held liquid from the carbon column can then be separated in the Florisil column to obtain a high purity styrene fraction.

We have described the practice of our invention under specific conditions. It should be understood that the conditions can be varied somewhat within the scope of the invention. Thus, we have described contacting the liquid mixture and adsorbent at atmospheric pressure and ambient temperature, i.e, about 75° F. and it is an important advantage that our process can thus be carried out at normal atmospheric conditions without requiring refrigeration of the charge liquid or of the adsorbent to avoid rapid polymerization of the styrene. However, if desired, the process can be carried out at somewhat higher or lower temperatures and pressures. It may be desired to cool the adsorbent column during the adsorption stage of the process to increase the adsorptive capacity of the adsorbent and to heat the column mildly during the removal of adsorbed material from the column. For these purposes, if desired, the column can be provided with tubes that pass through the bed of granular adsorbent and through which a heating or cooling fluid is passed. However, since it is essential in our process to avoid rapid polymerization of the styrene, any heating of the column, if employed in the desorbing stage, must be limited. The average temperature of the adsorbent bed and the liquid in contact with it should preferably be kept below about 150° F.

Pressures above or below atmospheric pressure can be used if for any reason this is desired. There is usually no advantage in using superatmospheric pressure but subatmospheric pressure can be advantageous in desorbing liquid from the adsorbent columns.

Another variable in any selective adsorption process is the liquid to adsorbent ratio. The well known principles concerning this ratio apply to our process as to other selective adsorption processes. For instance, the ratio of liquid to adsorbent should be sufficiently low to provide good separation. If too much liquid is charged to the adsorbent, the adsorbent will become saturated and further charging of liquid will result in no appreciable separation. Similarly, if the liquid to adsorbent ratio is too low, there will be an uneconomical use of the solid adsorbent beyond the amount needed for efficient separation. As we have indicated, when our process is practiced according to the elution chromatography technique the charge to adsorbent ratios should be such that the charge does not completely penetrate the adsorbent bed. When the percolation technique is applied to our process the charge to adsorbent ratio can vary considerably depending upon the purity of the products desired. The weight ratio of liquid to adsorbent can vary, for example, from about 0.2 to 20.

We have mentioned n-pentane as a suitable weak eluant for removing unadsorbed or weakly adsorbed liquid from the adsorbent columns. In general, saturated hydrocarbons such as n-pentane, n-hexane, n-heptane, isobutane, isopentane, isohexane, isoheptane, cyclopentane, cyclohexane, etc., can be used as the weak eluants and more strongly adsorbed materials such as olefins, aromatics, ketones, alcohols and amines can be used as subsequent eluants or displacer liquids of stronger eluting or desorbing powers.

The principles of our invention extend to the use of either of the adsorbents as the first adsorbent. However, it will generally be more economical and, therefore, is preferred, to contact the mixture to be separated first with the adsorbent which is selective for the minor component of the ethylbenzene-styrene mixture. The amount of adsorbent required will be less than would be required for the same degree of separation if the mixture is charged first to the adsorbent that is selective for the major component of the mixture.

Obviously many modifications and variations of the invention as hereinbefore set forth may be made without departing from the spirit and scope thereof and therefore only such limitations should be imposed as are indicated in the appended claims.

We claim:

1. The process for separating a mixture of ethylbenzene and styrene which comprises contacting such mixture with a first solid adsorbent selected from the group consisting of activated carbon having a surface area less than about 1100 square meters per gram and a porous solid consisting of at least 99 percent by weight magnesium silicate having a silica to magnesia weight ratio greater than 5 and having a surface area less than about 320 square meters per gram, recovering from the first adsorbent an unadsorbed liquid enriched in the component of the liquid mixture that is not preferentially adsorbed by said first adsorbent, removing remaining liquid from said adsorbent, contacting said liquid with the other of said adsorbents, and recovering an unadsorbed liquid enriched in the component that is not preferentially adsorbed by said other adsorbent.

2. The process for separating a mixture of ethylbenzene and styrene which comprises contacting such mixture with a first solid adsorbent selected from the group consisting of activated carbon having a surface area less than about 1100 square meters per gram and a porous solid consisting of at least 99 percent by weight magnesium silicate having a silica to magnesia weight ratio greater than 5 and having a surface area less than about 320 square meters per gram, recovering from the first adsorbent an unadsorbed liquid enriched in the component of the liquid mixture that is not preferentially adsorbed by said first adsorbent, removing remaining liquid from said adsorbent, contacting said liquid with the other of said adsorbents, recovering an unadsorbed liquid enriched in the component that is not preferentially adsorbed by said other adsorbent, recovering remaining liquid from said other adsorbent, combining said latter liquid with fresh mixture of ethylbenzene and styrene, contacting the combined liquid with the first adsorbent and repeating the described procedure.

3. The process for separating a mixture of a major amount of ethylbenzene and a minor amount of styrene which comprises contacting such mixture with an adsorbent column of activated carbon having a surface area less than about 1100 square meters per gram, recovering from the adsorbent carbon an unadsorbed liquid enriched in ethylbenzene, removing from the adsorbent carbon the remaining liquid enriched in styrene, contacting said liquid enriched in styrene with a column of adsorbent consisting of at least 99 weight percent magnesium silicate having a silica to magnesia weight ratio greater than 5 and having a surface area less than about 320 square meters per gram, and recovering from the magnesium silicate column an unadsorbed liquid enriched in styrene, the contacting of said liquids with said adsorbents being carried out at temperatures below 150° F.

4. The process for separating a mixture of a major amount of styrene and a minor amount of ethylbenzene which comprises contacting such mixture with a column of adsorbent consisting of at least 99 weight percent magnesium silicate having a silica to magnesia weight ratio greater than 5 and having a surface area less than about 320 square meters per gram, recovering from the magnesium silicate column an unadsorbed liquid enriched in styrene, removing from the magnesium silicate column the remaining liquid enriched in ethylbenzene, contacting said liquid enriched in ethylbenzene with an adsorbent column of activated carbon having a surface area less than about 1100 square meters per gram and recovering from the adsorbent carbon an unadsorbed liquid enriched in ethylbenzene, the contacting of said liquids with said adsorbents being carried out at temperatures below 150° F.

5. The process for separating ethylbenzene from styrene which comprises contacting a liquid mixture comprising a major amount of styrene and a minor amount of ethylbenzene with a solid adsorbent consisting of at least 99 percent by weight magnesium silicate having a silica to magnesia weight ratio greater than 5 and having a surface area less than about 320 square meters per gram and recovering from contact with the adsorbent an unadsorbed liquid of substantially higher styrene content than said liquid mixture.

References Cited in the file of this patent

UNITED STATES PATENTS

| | | |
|---|---|---|
| 2,359,346 | Winding | Oct. 3, 1944 |
| 2,518,236 | Hirschler | Aug. 8, 1950 |